Nov. 27, 1956     L. C. ROTTER     2,771,898

VALVE

Filed June 22, 1953     2 Sheets-Sheet 1

Lutwin C. Rotter,
Inventor.
Koenig and Pope,
Attorneys.

Nov. 27, 1956 L. C. ROTTER 2,771,898
VALVE
Filed June 22, 1953 2 Sheets-Sheet 2

Lutwin C. Rotter,
Inventor.
Koenig and Pope,
Attorneys.

United States Patent Office 2,771,898
Patented Nov. 27, 1956

2,771,898

VALVE

Lutwin C. Rotter, Maplewood, Mo., assignor to The McNeil Machine & Engineering Company, Akron, Ohio, a corporation of Ohio Application June 22, 1953, Serial No. 362,980

6 Claims. (Cl. 137—107)

This invention relates to valves, and more particularly to an anti-surge control valve for use in a fluid spray system.

The invention is an improvement upon the control valve shown in U. S. Patent 2,578,102, and among its several objects may be noted the provision of a simplified and more reliable valve of this class. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan of a valve of this invention, with parts broken away and shown in sections;

Fig. 4 is a right-end view of Fig. 2;

Fig. 4A is a transverse cross section taken on line 4A—4A of Fig. 2;

Fig. 5 is a developed longitudinal cross section taken on line 5—5 of Fig. 4A, on a reduced scale, showing parts in a rearward retracted position, and showing diagrammatically how a relief valve and an air supply line for an air motor are associated therewith;

Fig. 6 is a view corresponding to Fig. 5 showing parts in a forward position; and, Fig. 7 is a perspective showing a spray system in which the valve of this invention is used.

Figure 1:
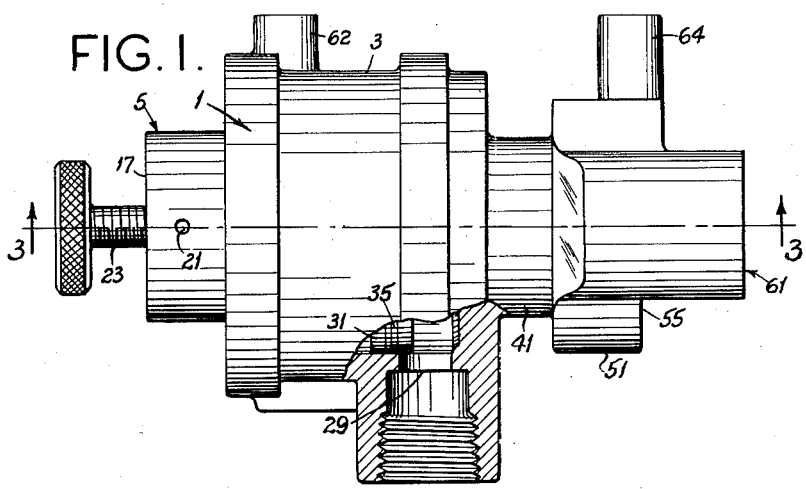
Figure 2:
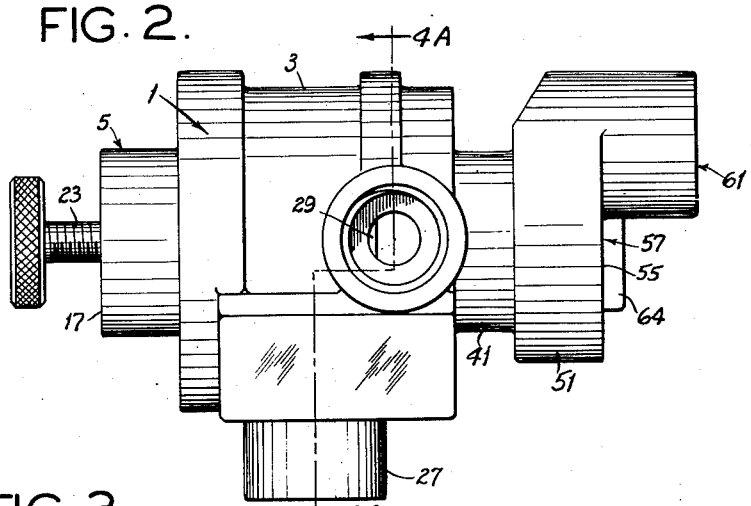
Fig. 2 is a side elevation of Fig. 1.

Referring to the drawings, a valve constructed in accordance with this invention is shown to comprise a metal body casting generally designated 1 formed to provide a main cylinder 3. One end of the cylinder 3 (its left end as illustrated) is closed by a hat-shaped head or plug 5. This end of the cylinder is referred to as its rearward end. This plug is fitted in a counterbore 7 and retained in place by a retaining ring 9 fitted in an annular groove 11 in the counterbore. A packing 13 is provided in an annular groove 15 in the rim of the plug for sealing purposes.

The crown 17 of the plug has an axial cylindrical bore 19, with a radial vent port 21 adjacent its outer end. An axial adjusting screw 23 is threaded in the end of the crown. This is retained against being threaded out of the crown by a cotter pin 25. The main cylinder 3 has a radial air inlet 27 for pressure fluid (specifically, air) located generally centrally of its length, and a radial or lateral outlet port 29 forward of the inlet. The lateral outlet port 29 is located adjacent the forward end of the cylinder 3.

Figure 3:
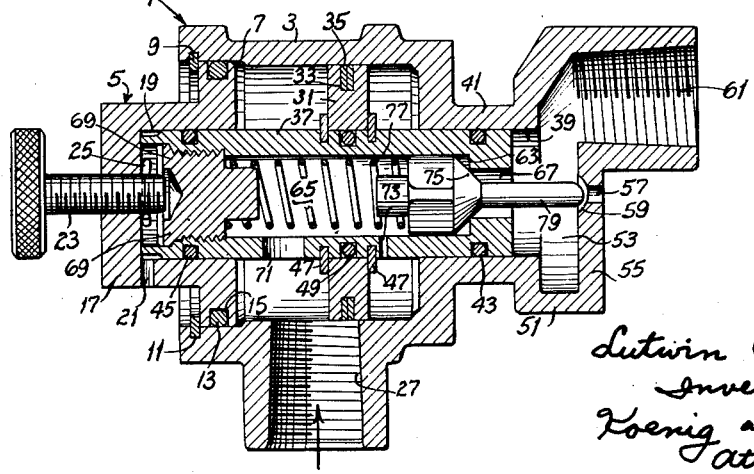
Fig. 3 is a longitudinal cross section taken on line 3—3 of Fig. 1.

A piston 31 is reciprocable in the cylinder 3 and is adapted to be moved by fluid pressure upon a pressure drop in the outlet 29 (such as occurs upon flow from the outlet) from the retracted position rearward of the outlet shown in Figs. 3 and 5 to the advanced position shown in Fig. 6 wherein the outlet is open to the space in the cylinder rearward of the piston. The piston has a peripheral annular groove 33 in which is received a spiral packing 35 for sealing engagement with the internal surface of cylinder 3. The packing 35 is preferably made of a tetrafluoroethylene polymer synthetic plastic, such as is sold under the trade name Teflon. This is especially suitable for the purpose as it has an extremely low coefficient of friction in respect to the metal of cylinder 3.

The piston 31 is fixed on a plunger 37, the latter extending axially and being movable with the piston. The plunger extends rearward from the piston into the bore 19 in the end plug 5 and forward from the piston into an opening 39 at the forward end of the cylinder. Opening 39 is formed as an axial bore in a reduced-diameter extension 41 of the cylinder 3 cast as an integral pare of the body 1. The plunger is slidable at its forward end in sealed relation in the opening, packing being provided for this purpose as shown at 43. The plunger is slidable at its rearward end in sealed relation in the bore 19, packing being provided for this purpose as shown at 45. The piston 31 is fixed on the plunger 37 by means of spring clips 47 received in annular grooves in the plunger. Packing is provided as shown at 49 for sealing the central opening in the piston which receives the plunger.

The body 1 is cast to provide means in the form of a cylindrical casing 51 larger than extension 41 defining a chamber 53 at the forward end of opening 39. The casing 51 has an end wall 55 in which is provided an axial vent port 57 in alignment with the plunger 37. Around the inner end of the vent port, the inside of wall 55 is formed as a valve seat 59. Offset from the vent port, the casing has a transfer port 61. The body 1 is cast with bosses 62 and 64 for mounting it on a support, such as a bracket (not shown) for hanging the valve on the rim of a drum.

The plunger 37 has a passage therethrough from rearward of the piston 31 to the forward end of the plunger, with a rearwardly facing valve seat 63 in the passage adjacent its forward end. The passage is formed by a main axial bore 65 in the plunger extending to the valve seat 63 and a smaller bore 67 extending from the valve seat 63 to the forward end of the plunger. The rearward end of the main bore 65 is closed by a threaded plug 69. Rearward of the piston 31, the plunger has a lateral port 71 for admitting pressure fluid to the bore 65. Forward of the piston, the plunger has a lateral bleed hole 73.

A check valve 75 is axially slidable in the main bore 65 of the plunger for engagement with the valve seat 63 to block flow through the plunger passage. This valve is of square cross section to provide for passage of air through the bores 65 and 67 when the valve is retracted rearward from seat 63. A coil compression spring 77 accommodated in the bore 65 reacts from the plug 69 against the valve 75 to bias it toward the forward end of the plunger for engagement with the seat 63. Under certain conditions, as will be made clear, this spring also acts to move the plunger 37 and piston 31 rearward from the advanced position of Fig. 6 to the retracted position of Figs. 3 and 5. The check valve 75 has a stem 79 of smaller cross section than bore 67 extending out of the forward end of the plunger in alignment with the vent port 57 for engagement with the seat 59 to close the vent port 57 when the poston 31 is in the advanced position shown in Fig. 6.

The arrangement is such that by retracting the adjusting screw 23 to its outer limit of adjustment permitted by the cotter pin 25, the plunger 37 and piston 31 may be permitted to assume that rearward retracted position illustrated in Figs. 3 and 5, in which the piston is located forward of the inlet port 27 and rearward of the outlet 29, the valve 75 is in engagement with the seat 63 under the bias of spring 77, and the valve stem 79 is withdrawn from seat 59 so that vent port 59 is open. Under these circumstances, the inlet 27 is in communication with the outlet 29 from one side of piston 31 to the other via the plunger port 71, the main bore 65 in the plunger, and bleeder hole 73. The chamber 53 is vented via the port 57.

The plunger 37 and piston 31 are movable forward (toward the right) from their retracted position of Figs. 3 and 5 to the forward position shown in Fig. 6, in which the valve stem 79 engages its seat 59 and closes port 57, in which the piston 31 is located somewhat forward of the rearward edge of outlet port 29, and in which the plunger 37 is advanced forward relative to the valve 75 so that the valve 75 is disengaged from its seat 63 for flow from bore 65 through bore 67 to chamber 53 and thence out through port 61.

The operation of the valve of this invention is best explained by reference to its use in a spray system such as is shown in Fig. 7. This system comprises a lance-type pump 81 for pumping material to be sprayed from a drum 83 via the pump outlet 85 and a hose 87 to a spray gun 89. The pump is driven by an air motor 91. Associated with the pump outlet 85 is an air-operated relief valve 93 for venting material from the hose 87 back into the drum. The relief valve 93, though it does not constitute a part of this invention, is shown in detail in Figs. 5 and 6 for purposes of explanation. It comprises a valve member 95 reciprocable back and forth across a vent port 97. On the valve member 95 is a piston 99 working in a cylinder 101. The valve member 95 is biased toward its open venting position by a spring 103. When air pressure is introduced behind the piston, the valve member is held closed against the bias of the spring. The port 29 is connected via an air pressure regulator 105 and an air hose 107 to the air inlet of the spray gun. The port 61 is connected via a fitting 109, an air hose 111, and a coupler 112 to the relief valve 93, and via the fitting 109, an air pressure regulator 113 and an air hose 115 to the pump motor 91.

When the spray gun 89 is shut off, the plunger 37 and piston 31 occupy their rearward retracted position shown in Figs. 3 and 5. Under these circumstances, the outlet port 29 carries air inlet pressure, being in communication with the air inlet 27 via plunger port 71, the plunger bore 65 and bleed hole 73. Thus the spray gun air regulator 105 is subjected to line pressure, and maintains regulated spraying air pressure in the air line 107. Also, air pressure on opposite sides of the piston 31 is balanced. The bore 65 is closed at its right end by valve 75, and hence supply of air to the chamber 53 (and to the air motor 91 and relief valve 93) is cut off. The port 57 is open, and the relief valve 93 is thereby vented, with concomitant venting of the hose 87 back to the drum 83.

When the spray gun is opened, pressure on the right side of piston 31 drops (since air line 107 is thereupon opened to atmosphere and air is restricted from flowing quickly enough through bleed hole 73 to equalize the pressure on opposite sides of the piston), and the pressure on the left side of the piston drives the piston and the plunger 37 to their advanced position shown in Fig. 6. During the initial phase of movement of the plunger 37, the valve member 75 and its stem 79 move with the plunger until the end of the stem 79 engages its seat 59 at the inner end of vent port 57 to close port 57. Then, with valve member 75 at rest, the plunger 37 continues its movement for some distance to effect movement of the valve seat 63 away from the valve member 75. The piston 31 moves across the outlet port 29.

The plunger 37 and piston 31 remain in their advanced position as long as the spray gun is open, inasmuch as the flow conditions establish higher air pressure on the left side of the piston than on its right, the differential in air pressure holding the spring 77 under compression. With the plunger and piston held in the advanced position, air flows directly from inlet 27 to outlet 29 and thence via regulator 105 and hose 107 to the spray gun. It also flows from inlet port 27 via plunger port 71, plunger bores 65 and 67, chamber 53, port 61, fitting 109, regulator 113 and hose 115 to the air motor 91 to drive the pump 81. Air pressure is maintained in line 111 to hold the relief valve 93 closed, thereby preventing by-passing material back into the drum.

When the spray gun is shut off following a spraying operation, air pressure on opposite sides of piston 31 is equalized, also air pressure in opening 39 helps return piston, and the spring 77 returns the plunger 37 and piston 31 to their rearward retracted position of Figs. 3 and 5. As this occurs, valve member 75 closes against its seat 63 to cut off flow of air to the air motor. Stem 79 opens vent 57, and the relief valve 93 thereupon vents the pressure in the hose 87. This automatic venting of pressure in the hose 87 after each spraying operation avoids surging of material from the spray gun the next time it is opened.

It will be observed that the action of the valve is such that air is supplied to the spray gun before material starts to flow from the spray gun. This is the ideal condition for spraying operations.

The adjusting screw 23 is used for circulating or mixing material in the drum, or for self-cleaning of the pump. For either of these purposes, with the spray gun shut off, and with the coupler 112 at the end of hose 111 removed from the relief valve, the screw 23 is threaded in to hold the plunger 37 and piston 31 in their forward position of Fig. 6. This effects delivery of air to the pump motor 91, operating the pump to withdraw material from the drum and deliver it back into the drum via the open relief valve.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A valve comprising a cylinder having an inlet for pressure fluid and a lateral outlet forward of the inlet, a piston reciprocable in the cylinder and adapted to be moved by fluid pressure upon a pressure drop in the outlet from a retracted position rearward of the outlet to an advanced position wherein the outlet is open to the space in the cylinder rearward of the piston, a plunger assembled with the piston and movable by the piston and extending forward from the piston with its forward end slidable in sealed relation in an opening at the forward end of the cylinder, the plunger having a passage therethrough from rearward of the piston to the forward end of the plunger, the plunger-piston assembly being formed to provide for communication between the space in the cylinder rearward of the piston and said passage and for restricted communication between the spaces in the cylinder rearward and forward of the piston, means at the forward end of the cylinder providing a chamber including an end wall having a vent port in alignment with the plunger with a valve seat at the inner end of the vent port, and also providing a transfer port through which fluid may flow to or from said chamber, the plunger having a rearwardly facing valve seat in the passage, a check valve in the plunger engageable with the seat in the passage for blocking flow through the passage, a spring biasing the check valve toward the forward end of the plunger for engagement with the seat in the passage, the check valve having a stem extending out of the forward end of the plunger in alignment with the vent port for engagement with the seat at the inner end of the vent port when the piston is in advanced position thereby to unseat the check valve and to close the vent port, the spring acting to drive the plunger rearward and move the piston to its rearward position upon cut-off of flow from the outlet thereby to seat the check valve and open the vent port.

2. A valve comprising a cylinder having a head at one end, this end being its rearward end, the cylinder having an inlet for pressure fluid and a lateral outlet forward of the inlet, a piston reciprocable in the cylinder and adapted to be moved by fluid pressure upon a pressure drop in the outlet from a retracted position rearward of the outlet to an advanced position wherein the outlet is open to the space in the cylinder rearward of the piston, a plunger movable by the piston and extending rearward from the piston with its rearward end slidable in sealed relation in an opening in the head, and extending forward from the piston with its forward end slidable in sealed relation in an opening at the forward end of the cylinder, the plunger having an axial passage therethrough from rearward of the piston to the forward end of the plunger, said passage being closed at the rearward end of the plunger and the plunger having a lateral port located within the cylinder rearward of the piston and extending from the outside of the plunger to said passage to provide for communication between the space in the cylinder rearward of the piston and said passage, said plunger further having a lateral bleed hole located within the cylinder forward of the piston and extending from said passage to the outside of the plunger to provide for communication between said passage and the space in the cylinder forward of the piston, means at the forward end of the cylinder providing a chamber including an end wall having a vent port in alignment with the plunger with a valve seat at the inner end of the vent port, and also providing a transfer port through which fluid may flow to or from said chamber, the plunger having a rearwardly facing valve seat in the passage, a check valve in the plunger engageable with the seat in the passage for blocking flow through the passage, a spring in the passage reacting from the closed rearward end of the plunger against the check valve to bias the check valve toward the forward end of the plunger for engagement with the seat in the passage, the check valve having a stem extending out of the forward end of the plunger in alignment with the vent port for engagement with the seat at the inner end of the vent port when the piston is in advanced position thereby to unseat the check valve and to close the vent port, the spring acting to drive the plunger rearward and move the piston to its rearward position upon cut-off of flow from the outlet thereby to seat the check valve and open the vent port.

3. A valve compressing a valve body providing a main cylinder, an extension from one end of the cylinder, this end being its forward end, the extention having an axial plunger-receiving opening, and a casing at the forward end of the extension defining a chamber at the forward end of the opening, the cylinder having a lateral inlet for pressure fluid and a lateral outlet forward of the inlet, a piston reciprocable in the main cylinder and adapted to be moved by fluid pressure upon a pressure drop in the outlet from a retracted position rearward of the outlet to an advanced position wherein the outlet is open to the space in the cylinder rearward of the piston, a head closing the rearward end of the cylinder having a vented axial plunger-receiving opening, a plunger movable by the piston and extending rearward from the piston with its rearward end slidable in sealed relation in the opening in the head and extending forward from the piston with its forward end slidable in sealed relation in the opening in the extension, the plunger having an axial passage therethrough from rearward of the piston to the forward end of the plunger, said passage being closed at the rearward end of the plunger and the plunger having a lateral port located within the cylinder rearward of the piston and extending from the outside of the plunger to said passage to provide for communication between the space in the cylinder rearward of the piston and said passage, said plunger further having a lateral bleed hole located within the cylinder forward of the piston and extending from said passage to the outside of the plunger to provide for communication between said passage and the space in the cylinder forward of the piston, the casing having an end wall in which there is a vent port in alignment with the plunger with a valve seat at the inner end of the vent port, and also having a transfer port through which fluid may flow to or from the chamber defined by the casing, the plunger having a rearwardly facing valve seat in the passage, a check valve in the plunger engageable with the seat in the passage for blocking flow through the passage, a spring in the passage reacting from the closed rearward end of the plunger against the check valve to bias the check valve toward the forward end of the plunger for engagement with the seat in the passage, the check valve having a stem extending out of the forward end of the plunger in alignment with the vent port for engagement with the seat at the inner end of the vent port when the piston is in advanced position thereby to unseat the check valve and to close the vent port, the spring acting to drive the plunger rearward and move the piston to its rearward position upon cut-off of flow from the outlet thereby to seat the check valve and open the vent port.

4. A valve as set forth in claim 3 wherein the head has an axial adjusting screw threaded therein for engagement with the rearward end of the plunger to hold the plunger and piston in the advanced position.

5. A valve as set forth in claim 3 wherein the piston carries a packing having a relatively low coefficient of friction with respect to the cylinder.

6. A valve as set forth in claim 3 wherein the piston carries a packing made of a tetrafluoroethylene polymer synthetic plastic.

References Cited in the file of this patent

UNITED STATES PATENTS

| | | |
|---|---|---|
| 2,578,102 | Stephenson et al. | Dec. 11, 1951 |
| 2,687,739 | Shelburne et al. | Aug. 31, 1954 |